United States Patent

[11] 3,570,809

| [72] | Inventor | Hans Stuy |
| | | Canastota, N.Y. |
| [21] | Appl. No. | 830,772 |
| [22] | Filed | June 5, 1969 |
| [45] | Patented | Mar. 16, 1971 |
| [73] | Assignee | Clarkson Industries, Inc. |
| | | Syracuse, N.Y. |

[54] SILENT HOSE COUPLING
7 Claims, 14 Drawing Figs.
[52] U.S. Cl. .................................................. 251/149.9,
137/360, 15/314
[51] Int. Cl. .................................................. F16l 37/28
[50] Field of Search............................................ 251/149.8,
149.9; 137/360, 317; 285/(Inquired), 7;
15/(Inquired), 314

[56] References Cited
UNITED STATES PATENTS

| 3,023,447 | 3/1962 | Senne.......................... | 15/314 |
| 3,088,484 | 5/1963 | Marsh.......................... | 137/360 |
| 3,335,744 | 8/1967 | Hanford....................... | 251/149.8 |

*Primary Examiner*—William R. Cline
*Attorney*—Curtis, Morris & Safford

ABSTRACT: The disclosure is directed to a coupling which eliminates air noise when connecting and disconnecting a detachable cleaning hose to a built-in vacuum-cleaning system for buildings having outlets in separate rooms in which a nipple at the end of the hose is moved into sealing engagement with a valve plug in an outlet and then turned to connect the hose to an exhauster through built-in piping, and an interlocking arrangement to prevent rotation of the valve plug except when the hose nipple is in sealing engagement therewith.

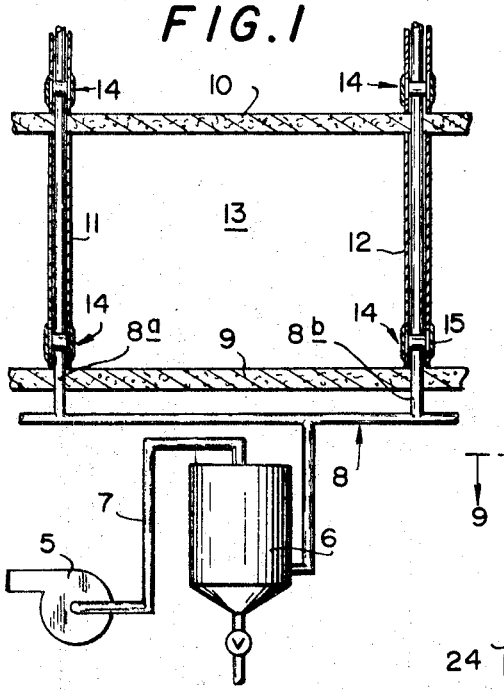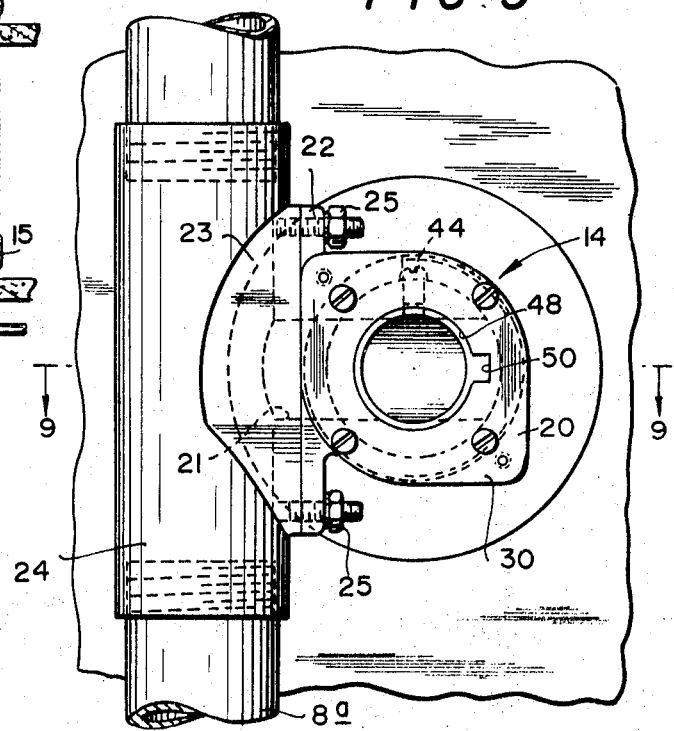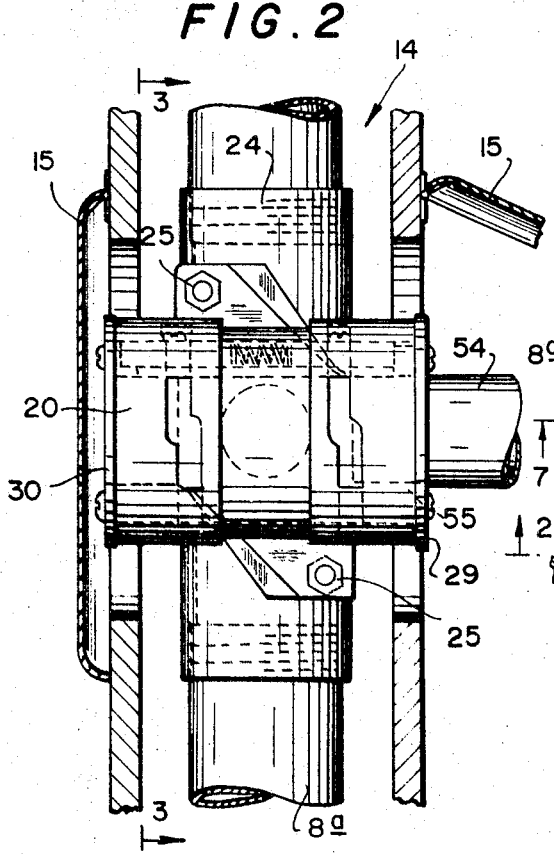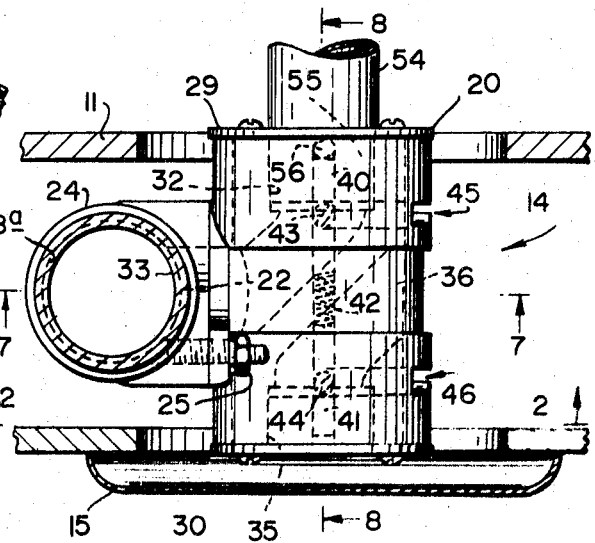
INVENTOR
HANS STUY
BY Curtis, Morris & Safford
ATTORNEYS

INVENTOR.
HANS STUY

BY Curtis, Morris & Safford
ATTORNEYS

INVENTOR.
HANS STUY

BY
Curtis, Morris & Safford
ATTORNEYS

SILENT HOSE COUPLING

The present invention relates to couplings for detachably connecting a hose to a piping system and more particularly to a coupling construction for connecting a flexible vacuum-cleaning hose to a vacuum-cleaning system.

Vacuum-cleaning systems are often built-in or installed in large buildings to facilitate the cleaning of different areas thereof. Such vacuum-cleaning systems comprise an exhauster connected to a piping system in the walls of the building and having an outlet in at least one wall of each enclosed area where cleaning is required. When an area is to be cleaned the attendant inserts a nipple at one end of a flexible cleaning hose into an outlet in the wall of the enclosure to connect the hose to the exhauster through the piping. A cleaning tool, such as a hollow brush or elongated nozzle, is connected to the opposite end of the hose, either directly thereto or through an intermediate wand, and the brush or nozzle is passed over the surface to be cleaned, the same as with a conventional tank-type vacuum cleaner. When the hose is coupled to and uncoupled from the outlet of such built-in vacuum-cleaning systems the rush of atmospheric air between the nipple of the hose and the outlet is apt to produce undesirable air noises. In many installations, such as hospitals, libraries and other public rooms such noise is particularly objectionable. Furthermore, the couplings commonly used are not foolproof and many times become disconnected during use with a resulting noise, reduction in the partial vacuum produced by the exhauster, and other disadvantages.

One of the object of the present invention is to provide an improved coupling for eliminating leakage while connecting and disconnecting a detachable hose to a source of air or other gas at a different pressure.

Another object is to provide a coupling of the type indicated for connecting and disconnecting a detachable cleaning hose to any of a plurality of outlets from fixed piping of a built-in vacuum-cleaning system without producing any air noise.

Another object is to provide an interlocking coupling and valve for connecting and disconnecting a flexible hose to the fixed piping of a built-in vacuum-cleaning system which is foolproof in operation to prevent a connection from being made from the hose to the piping until the end of the hose has been fully inserted in the outlet, and prevent the hose from being removed until it has been disconnected from the piping.

Still another object is to provide a coupling for connecting a flexible hose to the outlet from the fixed piping of a built-in vacuum-cleaning system which is of simple and compact construction, economical to manufacture, and one which is reliable in operation.

These and other objects will become more apparent from the following description and drawings, in which like reference characters denote like parts throughout the several views. It is to be expressly understood, however, that the drawings are for the purpose of illustration only and are not a definition of the limits of the invention, reference being had for this purpose to the appended claims.

In the drawings:

FIG. 1 is a sectional view of two floors of a building having a built-in vacuum-cleaning system with piping in the walls and showing the outlets in the separate rooms incorporating the novel features of the present invention;

FIG. 2 is an enlarged side elevational view of one of the outlets illustrated in FIG. 1 and showing the nipple at one end of the flexible cleaning hose inserted therein;

FIG. 3 is an end elevational view of the outlet illustrated in FIG. 2 and showing the notched recess in the side of the housing end plate for permitting the passage of a pin on the hose nozzle as the latter is inserted into the outlet;

FIG. 4 is a plan view of the outlet illustrated in FIGS. 1 to 3 and showing the end of the flexible hose and valve in the housing turned to connect the passage in the valve for communication with the piping of the vacuum-cleaning system;

Figure 6A:
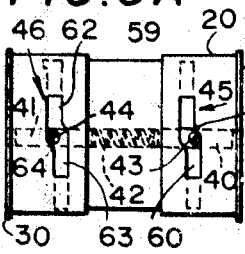
Figures 6B, 6C:
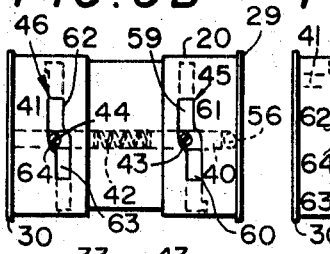
Figure 6D:
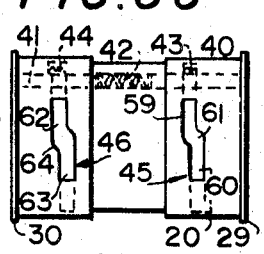
Figure 7:
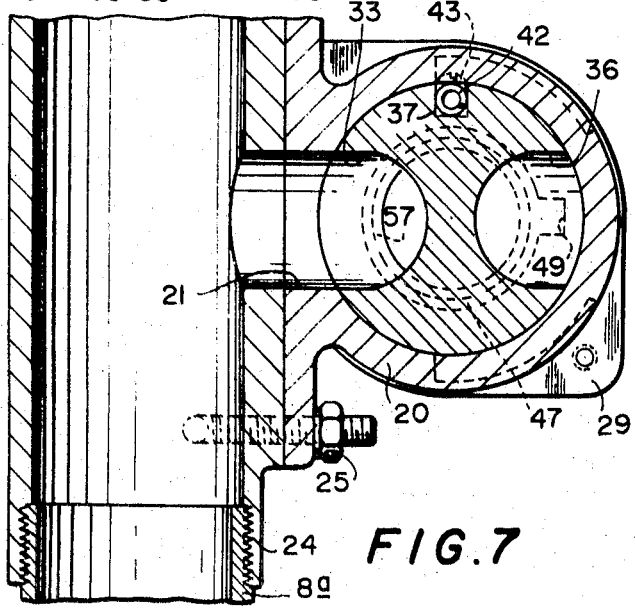
Figure 10:
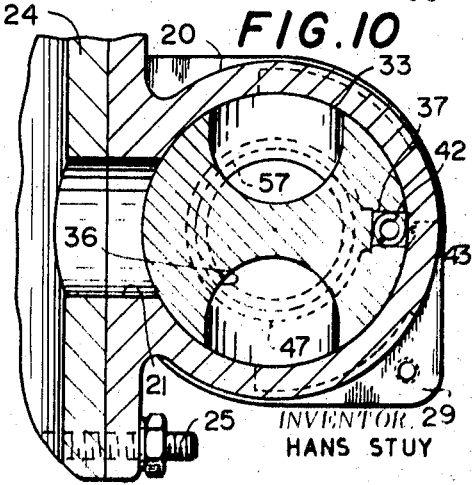
Figure 8:
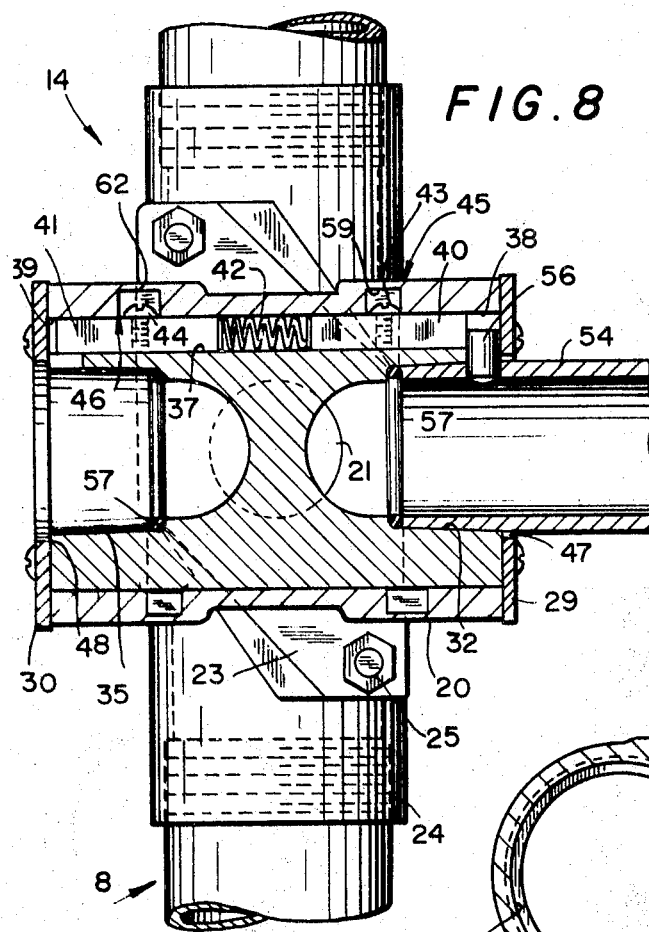
Figure 9:
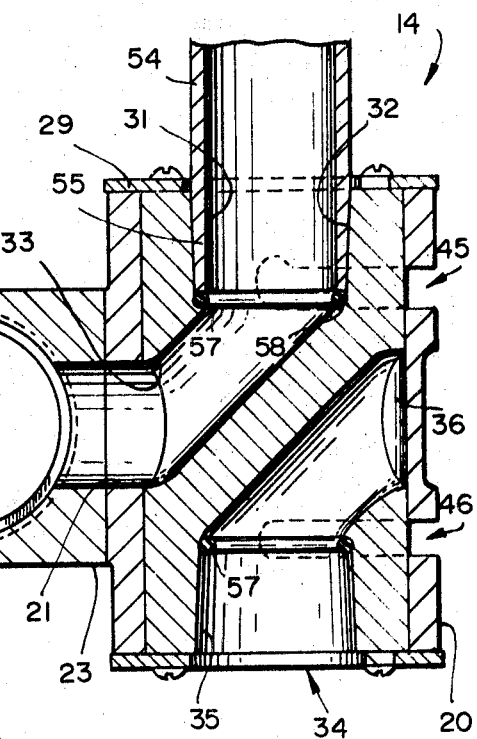
Figure 11:
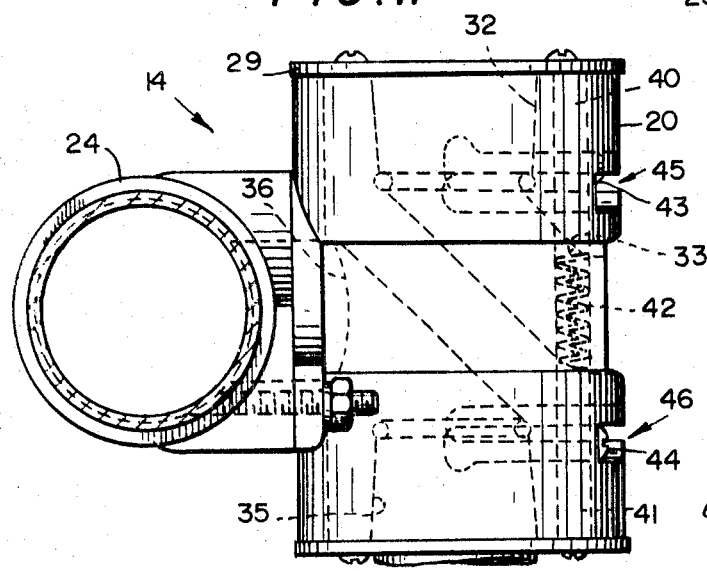

FIGS. 6-A to 6-D illustrate peripheral guideways in the inner periphery of the outlet housing which cooperate with outwardly projecting detents on keys to provide an interlocking arrangement to control the turning of the valve;

FIG. 7 is a transverse sectional view taken on line 7-7 of FIG. 4 to show one of the passageways in the rotated valve plug connecting the hose at the axis of the housing with the outlet port in the periphery of the valve housing;

FIG. 8 is a sectional view through the outlet and taken on line 8-8 of FIG. 4 to show the pin projecting from the nipple on the hose interlocked with the end plate on the housing and actuating one of the keys to permit the valve plug to be turned;

FIG. 9 is a sectional plan view taken on line 9-9 of FIG. 3 to show one passageway in the valve plug connected to the outlet port in the valve housing when the valve plug of the coupling has been turned by the nipple on the flexible hose;

FIG. 10 is a transverse sectional view similar to FIG. 7 showing the relationship of the passageways in the valve plug to the outlet port in the housing when the valve plug is in a disconnect position; and FIG. 11 is an enlarged top plan view of the outlet similar to FIG. 4, showing the relationship of the keyways on the rotatable valve plug and the grooves and slots in the housing.

The coupling of the present invention connects and disconnects a flexible hose to any one of a plurality of outlets from a piping system for air or other fluids such as a cleaning hose to the built-in piping of a vacuum-cleaning system for large buildings. The coupling comprises a nipple at one end of the detachable hose which is inserted into the open end of a valve plug in the outlet to form a sealed connection before the two parts can be turned as a unit to align one end of a passageway in the valve to a port in the outlet housing which is connected to the piping system. The valve plug may be single-ended to receive a hose at one end only, or double-ended to receive a hose at one end only, or double-ended to receive the hose at either end. Interlocking parts on the hose nipple, valve plug and valve housing prevent turning of the valve to open communication between the hose and piping system until the hose nipple has been seated and sealed in the valve plug to avoid air noise from leakage while the parts are being coupled. Also, interlocking means prevent removal of the hose until the valve is turned to close communication between the valve and the piping.

Referring now to the drawings, the coupling of the present invention is shown applied to a built-in type vacuum-cleaning system for a building having permanent piping in the walls thereof. As shown in FIG. 1, the vacuum-cleaning system comprises an exhauster 5 connected to a dust separator 6 through a conduit 7. The exhauster 5 and dust separator 6 may be located at any suitable place, such as the basement of the building. The lower end of the dust separator 6 is connected to a piping system 8 having sections such as 8-A and 8-B extending through the floors 9 and 10 and walls 11 and 12 of the building enclosing different areas or rooms such as 13. Each section 8-A and 8-B of the piping system 8 has outlets 14 to which one end of a detachable cleaning hose may be connected. Outlets 14 may have one end only adapted for connection to a hose, but preferably each outlet has its opposite ends open in adjacent rooms 13 for connection to a cleaning hose. Thus a single outlet 14 in a partition wall 11 may serve adjacent rooms at opposite sides of the wall. For purposes of illustration, a double-ended outlet 14 is illustrated in the drawings, but it will be understood that a single-ended outlet may be used of substantially identical construction. As shown in FIG. 2, each outlet is covered by a hinged cover plate 15 on the partition wall 11 which normally overlies the outlet but which may be lifted away from the outlet when a cleaning operation is to be performed.

Figure 5:
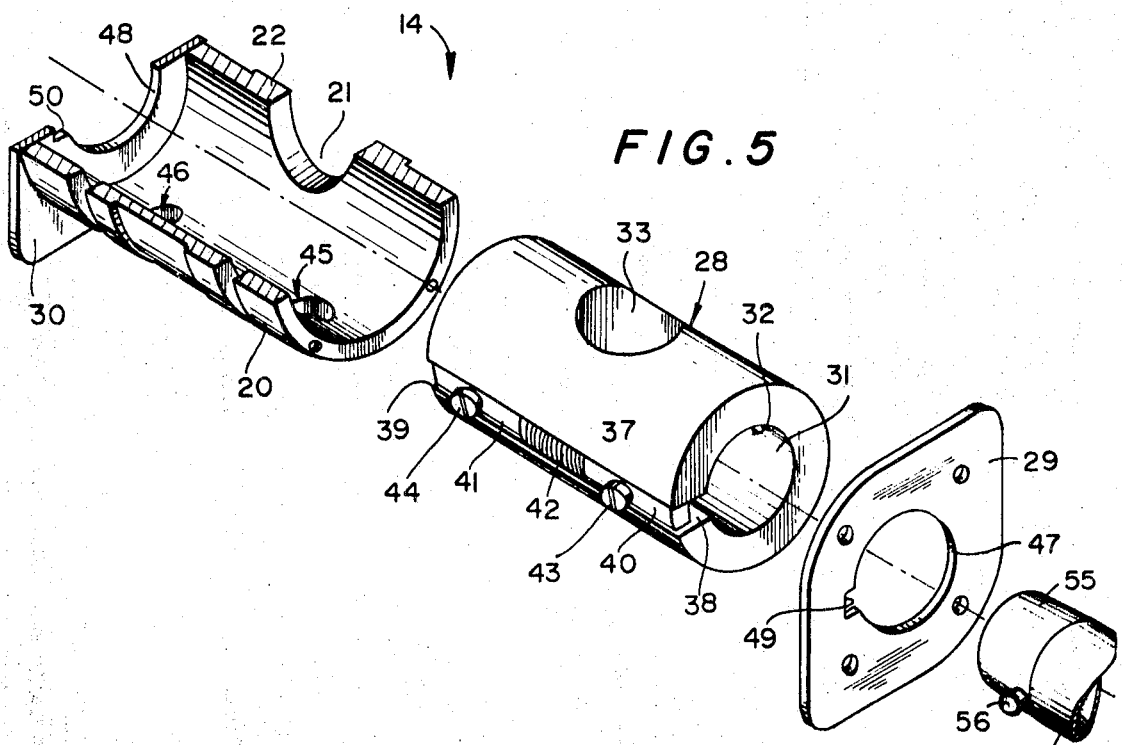
FIG. 5 is a perspective view of the outlet with the parts in extended relation and turned 90° from the position shown in FIG. 2, to illustrate the relationship between the housing, rotatable valve plug having a sliding key with outwardly projecting detents, end plates on the housing and nipple at the end of the flexible hose.

Each outlet 14 comprises a hollow cylindrical housing 20, see FIG. 5, having an outlet port 21 in the wall thereof. As shown in FIGS. 3 and 4, the housing 20 has a boss 22 surrounding the outlet port 21 which is connected by means of bolts 25 to the flat surface of a saddle 23 on a pipe fitting 24 in the piping system 8. A valve plug 28 of the same cylindrical contour as the housing 20 is adapted to closely fit the walls thereof and is held in place in the housing by end plates 29 and 30. The valve plug 28 has a passageway 31 forming an axially located port 32 at one end and a radial port 33 at its periphery at the opposite end. When an outlet 14 is to be used for a single room only, only one passageway 31 would be provided. In the illustrated embodiment, however, a similar passageway 34 is provided in the valve plug 28 having an axial port 35 at the opposite end of the valve plug and a radial port 36 located 180° from the port 33.

A keyway 37 is cut in the outer periphery of the valve plug 28 which extends longitudinally throughout its length and the ends of the keyway are cut through the wall for a short distance to form slots 38 and 39. Slidably mounted in the keyway 37 are keys 40 and 41 with a spring 42 between the inner ends yieldingly pressing the keys outwardly toward the ends of the valve plug. Each key 40 and 41 has a radially projecting detent 43 and 44, respectively. These detents 43 and 44 extend radially into guideways 45 and 46 in the housing for controlling the turning movement of the valve plug 28. In the construction shown, the guideways 45 and 46 extend through the wall of the housing 20 for a portion of their length to adapt the detent, such as screws, to be inserted into the keys 40 and 41, and the remainder of the guideways are in the form of grooves. It will be understood, however, that the guideways 45 and 46 may be slotted throughout their entire length.

The end plates 29 and 30 each has a circular opening 47 and 48, respectively, of a size and shape corresponding to the axial ports 32 and 35 in the valve plug 28 with a cutout slot 49 and 50 at one side thereof. The slots 49 and 50 in the end plates 29 and 30 align with the slots 38 and 39 in the wall of the valve plug 28 at the ends of the keyway 37.

The flexible cleaning hose 54 has a nipple 55 at one end with a radially projecting pin 56, see FIG. 5, adapted to enter the housing through the cutout slot 49 or 50 in the end plates 29 and 30. The nipple 55 and axial ports 32 and 35 may have a corresponding taper to seat, one in the other, in sealing engagement, or the end of the nipple may seat against a gasket in the valve, or O-rings may be provided between the nipple and valve to produce an airtight seal when the nipple is moved axially through the end plate 29 or 30 into the port opening 32 or 35 in the valve plug 28. In the illustrated embodiment a gasket 57 is provided between a shoulder 58 in the sidewall of the port 32 or 35 in the valve plug 28 for engagement by the end of the hose nipple 55, see FIG. 9.

As shown most clearly in FIGS. 6-A to 6-D, the guideways 45 and 46 in the inner periphery of the housing 20 have offset portions with a shoulder therebetween to provide an interlock that prevents rotation of the valve plug 28 except when a hose nipple has been inserted. More particularly, guideway 45 has radial sections 59 and 60 offset relative to each other and forming a longitudinally extending shoulder 61 therebetween, as shown in FIG. 6-A. The groove 46 also has radially offset portions 62 and 63 forming a longitudinally extending shoulder 64. Thus, when no hose nipple 55 has been inserted into an outlet 14, the radially projecting detents 43 and 44 underlie the longitudinally extending shoulders 61 and 64 of guideways 45 and 46 to lock the valve plug 28 against rotation in either direction. Furthermore, the valve plug 28 can only be released for rotation when a key 40 or 41 is moved longitudinally of the valve plug to align its radial detent 43 or 44 with the portion 59 or 63 of a guideway 45 or 46 in the wall of the valve housing 20.

FIG. 6-B illustrates the key 40 moved axially against the action of spring 42 by the pin 56 on the nipple 55 when the latter is inserted into the outlet 14 which enters the slot 38 in the end of valve plug 28 to engage the end of the key, see also FIG. 8.

Axial movement of key 40 then aligns its radial detent 43 with the section 59 of guideway 45. Valve plug 28 can then be turned clockwise as viewed in FIG. 4 from the position shown in FIG. 6-B to the position illustrated in FIG. 6-C. The engagement of the radial detent 43 on the key 40 with the sides of the guideway section 59 controls the rotation of the valve plug in the proper direction to align its radial port 33 with the outlet port 21 in the housing 20.

When a hose nipple 55 is inserted in the axial port 35 at the opposite end of the valve plug 28 the nipple pin 56 engages the key 41 to move it axially into alignment with the section 63 of guideway 46 to release the plug for rotation in the opposite direction to align the radial port 36 with the outlet port in the valve housing 20, see FIG. 11.

The pin 56 projecting from nipple 55 and end plate 29 or 30 also provide an interlock to prevent removal of the valve plug 28 from the outlet 14 until the valve plug has been turned to disconnect its radial ports 33 and 36 from communication with the outlet port 21 in the housing 20. As shown in FIG. 8, the pin 56 is positioned at the rear of the end plate 29 in all rotated positions of the hose nipple 55 and valve plug 28 except when the pin is aligned with the cutout notch 49 in the end plate for insertion or removal of the nipple. One form of the invention having now been described in detail, the mode of operation is next explained.

When an area is to be cleaned, such as the room 13 illustrated in FIG. 1, the nipple 55 at the end of the cleaning hose 54 is inserted in an outlet 14 in a manner illustrated in FIG. 2. In order to insert the nipple 55, the radial pin 56 has to be aligned with the cutout slot 49 in the circular opening 47 in the end plate 29, see FIGS. 3 and 5, and pressed axially into the open end of the passageway 31 in the valve plug 28 until the end of the nipple engages gasket 57, see FIG. 9, and seals the joint between the parts. Also the axial movement of the hose nipple 55 engages the radial pin 56 with the end of the key 40, see FIGS. 6-B and 8, and moves it axially until its radially projecting detent 43 aligns with the guiding portion 59 of the slotted groove 45. The hose nipple 55 is then turned clockwise as viewed in FIG. 4 and the projection of the radial pin 56 on the nipple 55 in the slot 38 at the end of the keyway 37 rotates the valve plug 28 until its outlet port 33 aligns with the outlet port 21 in the valve housing 20. Thus, the nipple 55 must be seated in sealing engagement in the port 31 in the end of the valve plug before the valve can be turned to align the outlet ports 33 and 21. This prevents any leakage of air between the parts which would create an undesirable air noise.

Simultaneously the turning of the hose nipple 55 engages the pin 56 projecting radially from nipple 55 with the rearward face of the end plate 29 to interlock the parts and prevent removal of the hose until the valve 28 has been turned back to a closed position. Thus, any possibility of air leakage and noise is prevented during the connection or disconnection of the hose nipple 55 and valve plug 28, constituting a coupling, and when once coupled the nipple is interlocked with the end plate 29 until the radial valve port 33 is moved out of register with the outlet port 21 in the valve housing 20, see FIG. 5.

The offset sections of the guide tracks 45 and 46 also control the rotation of the valve plug. For example, the engagement of the radially projecting detents 43 and 44 with the intermediate shoulders 61 and 64 of the track sections, prevents rotation of the plug 28 until a hose nipple 55 is inserted. This prevents air from entering the passageway 31 or 34 of the valve plug 28 except when a hose nipple 55 is sealed therein to further prevent any undesirable noise or additional load on the exhauster 5. It will also be noted that the guide tracks 45 and 46 permit rotation of the valve plug 28 through an arc of 90° in opposite directions to move one or the other of the outlet ports 33 and 36 from the position shown in FIG. 10 into register with the outlet port 21 in the housing 20. Guide tracks 45 and 46 also limit the rotation of the valve plug 28 to insure the proper positioning of the outlet ports 33 and 36 in register or out of register with respect to the outlet port 21 in the valve housing 20.

After a cleaning operation has been completed the hose nipple 55 is rotated in the opposite direction through 90° from the position shown in FIG. 7 to that shown in FIG. 10, at which time the radial pin 56 aligns with a notch 49 or 50 in the end plate 29 or 30 so that the hose nipple may be withdrawn from the outlet 14.

It will now be observed that the present invention provides an improved coupling for connecting and disconnecting a detachable hose without leakage of a fluid, such as air, between the parts. It will also be observed that the present invention provides a coupling of the type indicated which eliminates air noise when connecting or disconnecting a detachable cleaning hose to the fixed piping of a built-in vacuum-cleaning system. It will still further be observed that the present invention provides a hose and valve coupling which interlock to prevent connection to the vacuum system until the hose is fully inserted and prevents the hose from being removed until the vacuum connection is interrupted. It will still further be observed that the present invention provides a coupling of the type indicated which is of simple and compact construction, adapted for economical manufacture, and one which is reliable in operation.

While a single embodiment of the invention is herein illustrated and described, it will be understood that modifications may be made in the construction and arrangement of elements without departing from the spirit or scope of the invention. Therefore, without limitation in this respect, the invention is defined by the following claims:

I claim:

1. A coupling for connecting a hose to a source of fluid at a pressure different from atmospheric pressure comprising an outlet having a hollow housing with a circular opening at one end and a peripheral wall having a port connected to said source of fluid, a valve in said housing which closely fits the peripheral wall thereof and having a passageway therein forming ports at the open end of said housing and at its periphery, respectively, a nipple at the end of the hose adapted to seat in sealing engagement with the port in said valve at the open end of the housing, a groove in the peripheral wall of the housing having an axially extending portion and a radially extending portion, a keyway in the outer peripheral wall of said valve, a key mounted to slide in said keyway in said valve, a detent projecting outwardly from the key into said groove in the peripheral wall of said housing and engaging the axially extending portion thereof, and a pin projecting radially from the nipple for engaging the key and moving it along the valve until the detent aligns with the radial portion of said groove whereby to permit the valve to be turned to connect its passageway with the port in the housing only after the nozzle has been seated in the valve to prevent air noise resulting from leakage between the parts.

2. In a vacuum-cleaning system of the type having a central exhauster connected to piping extending to different areas of a building and having outlets for connection to a detachable cleaning hose and in which each outlet comprises a housing having a cylindrical wall with a port connected to the piping, a cylindrical valve plug in the housing having a passageway therein forming port openings at one end and in its periphery, respectively, and a nipple at the end of a detachable hose adapted to be moved into the port opening in the end of the valve, that improvement comprising an interlocking means between the valve plug and housing to prevent rotation of the valve plug when the cleaning hose is detached, said valve and nipple on the hose providing a seal when the nipple is inserted in the valve, and means on the nipple engaging and releasing the interlocking means when the nipple is moved into sealing engagement with the valve to permit the valve to be turned to connect the hose to the exhauster through the piping.

3. A coupling for connecting a cleaning hose to a built-in vacuum-cleaning system for buildings having separate rooms and piping in the walls of each room, an outlet from the piping in at least one wall of each room comprising a housing having a cylindrical wall with an outlet port connected to the piping of the vacuum system, a cylindrical valve plug rotatable in said housing and having a passageway therein forming a port at its periphery and at one end thereof, end plates at the ends of the housing and valve plug, a keyway extending longitudinally in the periphery of the valve plug, a key slidable in the keyway and having at least one detent projecting from the key, a groove in the wall of the housing having longitudinal and radial sections, a slot underlying the keyway adjacent the end of the valve plug, a spring acting on one end of the key to yieldingly hold the detent in the longitudinal section of the groove to prevent rotation of the valve plug, at least one end plate having a circular hole in alignment with the port opening in the end of the valve and a notch at one side thereof, a detachable hose having a nipple at one end adapted for insertion through the hole in the end plate to seat in the port opening in the end of the valve plug, and a pin projecting from the nipple for movement through the notch in the side of the end plate and a slot in the end of the valve plug to move the key and detent along the longitudinal portion of the slot in the housing until the nipple is seated in the valve port and the detent is aligned with the radial portion of the slot so that the valve may be turned by the pin and nipple to align the port in the valve plug in communication with the outlet port in the housing wall.

4. A coupling for detachably connecting a cleaning hose to a vacuum-cleaning system for buildings in accordance with claim 3 in which each outlet comprises a fitting in the piping system.

5. A coupling for detachably connecting a cleaning hose to a vacuum-cleaning system in accordance with claim 3 in which each outlet projects from the piping through an opening in the wall, and a movable cover plate on the wall overlying the outlet and open end of the valve.

6. A coupling for detachably connecting a cleaning hose to a vacuum-cleaning system for buildings in accordance with claim 3 in which the piping system comprises connecting piping sections in the walls of the building, each outlet housing extending to opposite sides of the wall into adjacent rooms, said valve plug having separate passageways with each having a port at its periphery and a port at one of the ends of the valve plug, respectively, said keyway extending longitudinally of the valve plug throughout its length, keys in the keyway with each having a detent projecting radially therefrom, and separate grooves in the housing into which the detents project for controlling rotation of the valve plug in opposite directions.

7. A coupling in accordance with claim 6 in which the separate grooves each has a longitudinal section and a radial section, and said spring acting between adjacent inner ends of the keys to hold them separated in interlocked relation with the longitudinal sections of the respective grooves to prevent rotation of the valve plug until one of the keys is moved along the valve plug into alignment with a radial section of its slot whereby to permit rotation of the valve plug only when a hose nipple is inserted into the outlet.